United States Patent
Gillett et al.

(10) Patent No.: US 7,601,786 B2
(45) Date of Patent: Oct. 13, 2009

(54) TUBULAR REACTOR WITH COAXIAL CYLINDERS AND PROCESS USING THIS REACTOR

(75) Inventors: Christopher Robert Gillett, Bradford (GB); Gareth Ian Naylor, Halifax (GB)

(73) Assignee: Ciba Specialty Chemicals Water Treatments Ltd., West Yorkshire, Bradford (GB)

(*) Notice: Subject to any disclaimer, the term of this patent is extended or adjusted under 35 U.S.C. 154(b) by 781 days.

(21) Appl. No.: 10/450,622

(22) PCT Filed: Dec. 10, 2001

(86) PCT No.: PCT/EP01/14455

§ 371 (c)(1),
(2), (4) Date: Jun. 16, 2003

(87) PCT Pub. No.: WO02/49756

PCT Pub. Date: Jun. 27, 2002

(65) Prior Publication Data

US 2004/0048988 A1 Mar. 11, 2004

(30) Foreign Application Priority Data

Dec. 21, 2000 (GB) .................................. 0031254.6

(51) Int. Cl.
*C08F 2/04* (2006.01)
*C08F 2/48* (2006.01)

(52) U.S. Cl. ............................. 526/64; 526/88; 422/136

(58) Field of Classification Search .................. 422/136; 526/64, 88

See application file for complete search history.

(56) References Cited

U.S. PATENT DOCUMENTS 2,857,144 A 10/1958 Gurly, Jr. et al. ................ 259/7
4,981,727 A * 1/1991 Brinduse et al. ......... 427/385.5

(Continued)

FOREIGN PATENT DOCUMENTS

DE 4203278 8/1993

(Continued)

OTHER PUBLICATIONS

Patent Abstracts of Japan vol. 1996, No. 8, Aug. 30, 1996 for JP 08109208.

*Primary Examiner*—Arun S Phasge
(74) *Attorney, Agent, or Firm*—Shiela A. Loggins

(57) ABSTRACT

A process of preparing a liquid reaction product in a column reactor, which reactor comprises a space between coaxial tubular interior surfaces comprising an inner interior surface and an outer interior surface, comprising the steps, a) feeding the liquid precursor reactant material through an inlet port in the outer interior surface, b) flowing the liquid precursor material through the space between the outer interior surface and the inner interior surface, c) subjecting the liquid precursor material in step (b) to reaction conditions to form the liquid reaction product, d) passing the liquid polymer composition through an outlet port in the outer interior surface, characterised in that the distance of the inner internal surface and the outer interior surface is less than 20 mm and the ratio of the cross-sectional diameter (D') of the inner interior surface to the cross-sectional diameter (D") of the outer interior surface is at least 0.8:1. Also claimed is an apparatus suitable for carrying out chemical reactions. Derisably the apparatus and process can be used to make liquid polymer compositions.

14 Claims, 4 Drawing Sheets

Figure 1:
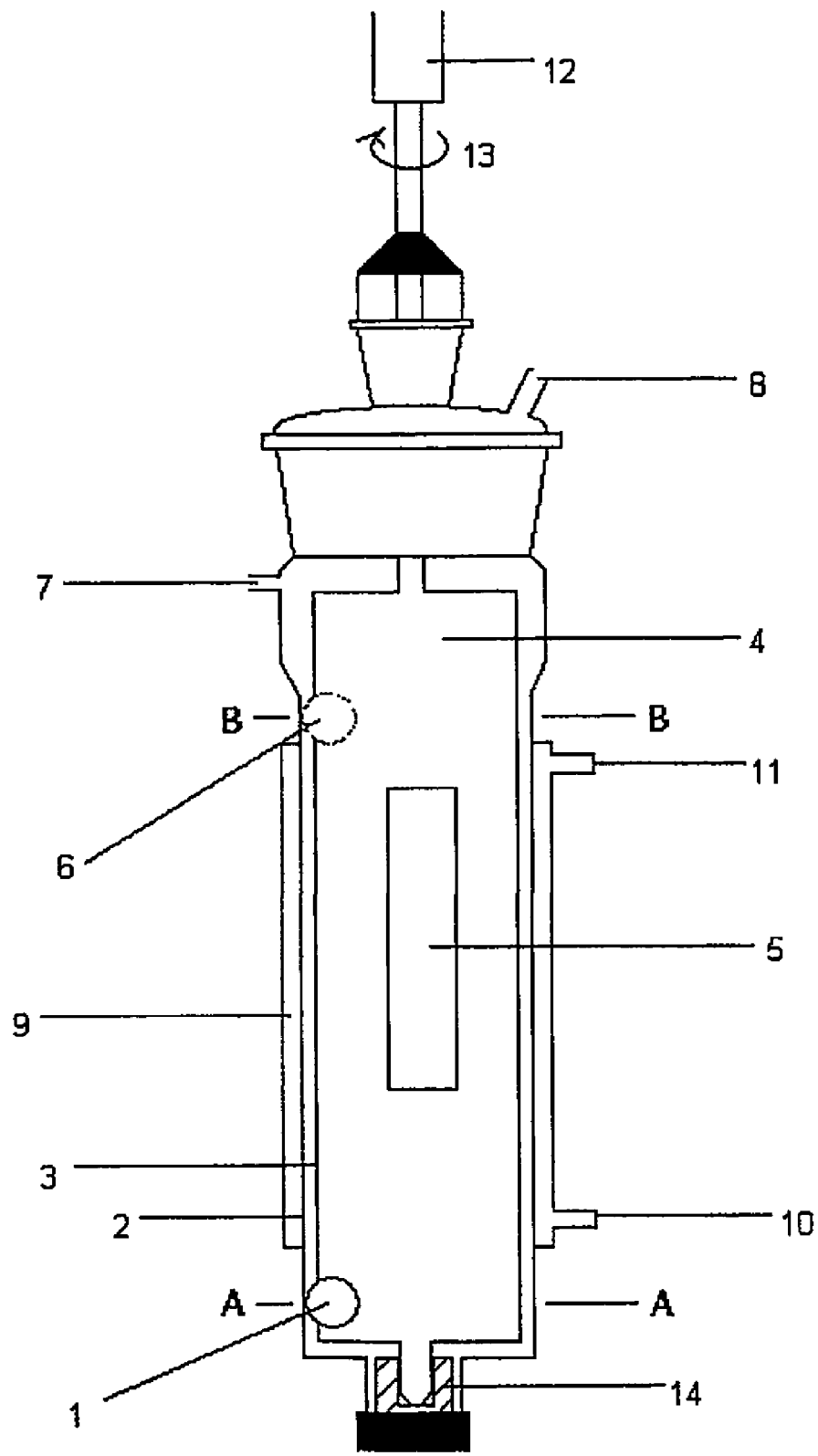

| U.S. PATENT DOCUMENTS | | | | | |
|---|---|---|---|---|---|
| 5,372,781 A | * 12/1994 | Hallett et al. ............ 422/186.3 | EP | 0721920 | 7/1996 |
| 5,470,539 A | * 11/1995 | Imamura et al. ............ 422/136 | GB | 2103229 | 2/1983 |
| 5,576,386 A | 11/1996 | Kempter et al. ............... 526/88 | WO | 94/11096 | 5/1994 |
| 5,725,757 A | 3/1998 | Binot .......................... 210/85 | | | |

FOREIGN PATENT DOCUMENTS

| EP | 0498583 | 8/1992 |
|---|---|---|

* cited by examiner

TUBULAR REACTOR WITH COAXIAL CYLINDERS AND PROCESS USING THIS REACTOR

The present invention concerns a process of preparing liquid reaction products, particularly liquid polymer compositions in a column reactor. The invention also relates to a novel column reactor for conducting chemical reactions.

It is known to carry out various liquid phase reactions in various types of reaction vessels including standard pot-shaped vessels and tubular reactors.

It is known to conduct oil-in-water emulsion and bead polymerisation processes, using water-insoluble monomer or monomer blend dispersed in water, under conditions whereby collisions between the beads during polymerisation can be reduced. For instance in GB 1,124,610 it is proposed to form a monomer emulsion, having a particle size below 5 microns, and to feed this into a simple tubular loop reactor in which the tubular reactor has an upwardly extending tubular leg which leads, at its top, into a downwardly extending tubular leg. Monomer emulsion is fed into the base of the upwardly extending leg and polymer emulsion is taken, when appropriate, from the base of the downwardly extending leg.

The upward and downward movement of the emulsion is due, at least in part, to changes in specific gravity as the polymerisation proceeds. The polymerisation period is suggested as 0.5 to 20 hours, preferably 1 to 10 hours.

In U.S. Pat. No. 3,922,255 a blend of water-insoluble monomers is fed through orifices (to form non-aqueous beads) into the base of a vertical column along with an aqueous medium containing a stabiliser such as gelatin. This aqueous medium and the non-aqueous monomer beads travel together upwardly through the column and thereby form a dispersion of beads in water in the column. In an example, the time of travel through this column averages 3.5 minutes. The dispersion is taken from the top of this column through a line and fed to the top of a downwardly extending column heated to a temperature at which polymerisation is initiated. Accordingly there is no initiation of polymerisation until a considerable period after contact of the beads with the continuous phase, including passage through a feed line. The beads and the aqueous medium are caused to flow slowly down this column, with a residence time of 150 minutes in an example. The resultant slurry of partially polymerised beads is taken from the base of the column, some of the aqueous medium recycled to the top of the column, and the beads and the remainder of the aqueous medium are fed to a reactor where they are subjected to further reaction for, in an example, four hours.

WO-A-0007717 describes closed loop continuous emulsion polymerisation apparatus comprising a circulation pump, a reactor tube that connects the outlet of the circulation pump to its inlet and a feed for supplying raw materials. This apparatus also comprises an additional tube for bypassing a pig around the circulation pump. This disclosure provides that advantage of allowing more freedom in the choice of circulation pump.

In EP-A-67,415, water-insoluble monomer is fed through a droplet generator into an aqueous suspension medium containing a stabiliser so as to form a suspension of droplets in the aqueous medium. This suspension is then fed through a line to the top of a column where polymerisation is initiated and the aqueous medium flows downwardly at a rate such that the droplets initially reside at the top of the column but sink, concurrent with the downflowing liquid, as polymerisation progresses. In an example, the residence time in this column is 170 minutes. The aqueous medium and the droplets are then reacted under plug flow conditions in another reactor, and the resultant suspension of partially polymerised beads in aqueous medium is then fed into a third reactor which is another column and wherein aqueous medium flows upwardly and the polymer beads, when they are completely polymerised, sink to the base of the column and are recovered. The total polymerisation time is around 5 hours in an example.

U.S. Pat. No. 4,448,657 describes the use of initiators which generate triplet radical pairs in an emulsion polymerisation process. In this process the triplet radical pairs can be controlled by the application of a magnetic field. Both the rate of polymerisation and the molecular weight of the polymer can be controlled.

In U.S. Pat. No. 4,444,961 a particular system is described for forming a dispersion of monomer beads in an immiscible liquid. This comprises a perforated plate separating a monomer supply from a vertical column of the immiscible liquid, and a vibrating pump for pulsing beads through the perforated plate into the column. In the preferred embodiments, the monomer is water-insoluble monomer and the beads are pulsed into the base of an upwardly flowing column of water. However it is also proposed that the beads could move countercurrent to the flow of the column.

It is also proposed that a water-soluble monomer blend could be pumped as beads into a column of water-immiscible liquid, in similar manner. The monomer droplets flow through this column and emerge from it as a dispersion in the immiscible liquid. The dispersion is then passed through a line into a separate vessel in which the agitation is provided to maintain a dispersion of the droplets and then polymerisation is initiated.

EP-A-498583 describes a process of continuously preparing polymer particles having a small particle diameter and a narrow particle diameter distribution by emulsion polymerization or a suspension polymerization. The polymerization reaction is carried out by supplying a material solution for polymerization continuously to a clearance between coaxial double cylinders and by rotating at least one of the double cylinders about the axis and the inducement of Taylor vortices are essential to this process.

An article by Tsuyoshi Imamura entitled, "A new approach to continuous emulsion polymerization" Polymer International 30 (1993) 203-206 describes continuous emulsion polymerization in a Couette-Taylor vortex reactor. The reactor proposed for generating the Taylor vortex had a ratio of the diameter of the inner cylinder to the diameter of the outer cylinder of 0.54:1.

However, despite all of these developments there still remains a need for a continuous process which provides a more consistent high quality polymer product. In particular there is a tendency due to inconsistent or incomplete mixing of raw material products, for polymerisation processes to result in products with variable quality. Thus in some cases polymer compositions may contain unacceptable levels of unreacted monomer or may contain high concentrations of insoluble polymer or substandard polymer components. There also remains a need for a continuous process that conveniently allows the post treatment of polymer compositions to provide a consistent post treated polymer product.

Thus according to a first aspect of the invention we provide a process of preparing a liquid reaction product in a column reactor, which reactor comprises a space between interior surfaces comprising an inner interior surface and an outer interior surface, comprising the steps, a) feeding a liquid reaction precursor material through an inlet port in the outer interior surface,
b) flowing the liquid precursor material through the space between the outer interior surface and the inner interior surface,
c) subjecting the liquid precursor material in step (b) to reaction conditions to form the liquid reaction product,
d) passing the liquid reaction product through an outlet port in the outer interior surface,
characterised in that the distance of the inner internal surface and the outer interior surface is less than 20 mm.

Generally speaking the inner and out interior surfaces should be coaxial tubular surfaces. One or both of the tubular surfaces may have a polygonal cross-section, but preferably the tubular surfaces are both cylindrical. Where one of the surfaces has a polygonal cross-section, it is preferred that it is the inner interior surface that has a polygonal cross-section and that the outer interior surface is cylindrical. When one or both of the tubular surfaces has a polygonal cross-section it is generally preferred that the number of sides is at least 6 or 7. Typically cross-sectional polygons with more sides are preferred, for instance 10 or 20 or more. When one or both of the tubular surfaces has a polygonal cross-section it is maximum distance between the inner and outer interior surfaces which should be less that 20 mm.

It is preferred that both the inner and outer tubular surfaces are both cylindrical and thus preferred that the distance between the inner and outer surface remains constant. In this way the outer internal surface may be the inner surface of the exterior wall of the reactor and the inner internal surface may be the outer surface of a cylindrical element which rotates about its central axis. The internal surfaces are desirably smooth and preferably free from protrusions. The surfaces should be arranged longitudinally in line with the reactor. Preferably at least one of the internal surfaces moves. Although it is conceivable that both the inner and outer internal surface moves in a rotating manner, generally only one of the interior surfaces rotates.

We have found considerable improvements in product consistency can be achieved when the space confined by the internal surfaces is relatively narrow, i.e. the distance between the inner internal surface and outer internal surface are relatively close.

Preferably the ratio of the cross-sectional diameter (D') of the inner interior surface to the cross-sectional diameter (D") of the outer interior surface should be at least 0.8:1. In particular the ratio of D' to D" should be at least 0.9:1 and especially at least 0.98:1. We have found that the process can be operated most effectively when the ratios D' to D" are in the range 0.990:1 to 0.999:1. When one or both of the cylinders has a polygonal cross-section the ratio is determined by the effective average diameter of each tubular surface.

In particular we have found that improved products can be obtained by conducting the process in a column reactor comprising at least two internal surfaces and in which the surface area of the inner internal surface is close to that of the outer internal surface. Generally the surface area of the inner internal surface is at least 80% of the surface area of the outer internal surface. Preferably the surface area of the inner internal surface is at least 85% of the outer internal surface, more preferably at least 90%, most preferably at least 95%.

Suitably any liquid reaction product can be produced according to the invention. The reaction product may be prepared by flowing one or more liquid reactant material into the reactor. The reaction may be started or enhanced by the application of electromagnetic radiation, heating or cooling. A suitable process can be a photochemical reaction process, in which the reaction medium is irradiated within the reactor. This can easily be achieved by employing an external radiation source and positioning the radiation source at or close to the external surface of the reactor, wherein the reactor wall allows the transmission of the radiation. Preferably the reaction product is a liquid polymeric composition.

In one form of the invention the liquid precursor material, is a liquid polymerisable material and the reaction conditions are polymerisation conditions. Thus in this form of the invention a liquid monomeric material is fed into the reaction vessel and is allowed to pass between the two internal surfaces, during which the monomer is subjected to polymerisation conditions. The polymeric composition that is formed must be a liquid so that it can flow out of the reactor with ease. Desirably the composition is of relatively low viscosity, for instance below 5,000 mPa·s (measured using a Brookfield RVT, spindle 4, 50 rpm, 25° C.), Preferably the final polymer composition will be of low viscosity, for instance below 1,000 mPa·s. More preferably the viscosity of the polymer composition is below 500 mPa·s, especially below 100, in particular less than 50 or even 10 or 20 mPa·s.

The polymerisation process may desirably involve incorporating polymerisation initiators into the monomer component. The initiators may be any suitable initiators and are described in the prior art. Typically the initiators may be a redox couple, for instance employing a reducing agent for instance a sulphite or sulphur dioxide in conjunction with an oxidising agent such as a peroxy compound or bromate. These may be incorporated prior to entering the polymerisation reactor or one half of the redox couple may be incorporated inside the polymerisation reactor. Other reaction mechanisms include thermal initiators, for instance employing azo initiators, such as azobisisobutyronitrile (AZDN) and then exposing the monomer to temperatures sufficient for the thermal initiator to initiate polymerisation. In this situation one of the internal surfaces may provide the heat trigger which initiates the polymerisation. In another form of the process the liquid polymerisable material may also comprise an ultra violet (UV) initiator and polymerisation would be initiated by subjecting the composition to UV irradiation inside the reactor.

Suitable ultra violet initiators include compounds of formula:

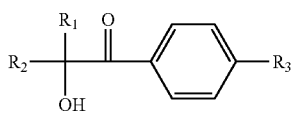

wherein $R_1$ and $R_2$ are each independently $C_{1-3}$ alkyl or together form a $C_{4-8}$ cycloaliphatic ring, $R_3$ is H, $C_{1-2}$ alkyl or —O(CH$_2$CH$_2$)$_n$OH and n is 1-20. An especially preferred ultra violet initiator is the compound defined by the formula,

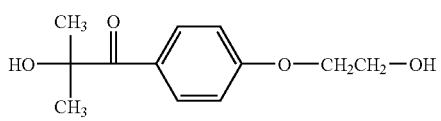

known as 1-[4-(2-Hydroxyethoxy)-phenyl]-2-hydroxy-2-methyl-1-propane-1-one supplied as Irgacure® 2959 photoinitiator by Ciba Specialty Chemicals.

Another typical UV initiator is the compound of the formula,

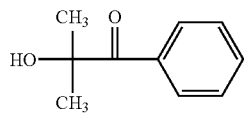

known as 1-phenyl-2-hydroxy-2-methyl-1-propane-1-one supplied as Darocure® 1173 photoinitiator by Ciba Specialty Chemicals.

Desirably the ultra violet initiator is used in an amount up to 10,000 ppm by weight of monomer. However, for economic reasons it is usually preferred not to use more than about 5,000. Suitable results are often obtained when the ultra violet initiator is included in an amount in the range 50 to 3,000 ppm, more preferably 100 to 2,500 ppm, especially 500 to 2,000 ppm.

When polymerisation by ultra-violet irradiation is used, this can be achieved by using one or more usually a multiplicity of UV sources arranged around the reactor, wherein at least a portion of the reactor wall comprises a material that allows the transmission of the UV light, such that the UV light is allowed to enter the space between the inner and outer surfaces. UV conditions specified in the known prior art may be used in the process of the present invention. We have found that suitable conditions are those which provide a UV intensity of 1 mW/cm$^2$ inside the reactor. Typically the wavelengths will be in the range of 315 to 408 nm, preferably 340 to 370 nm. Any UV lamps suitable for polymerisation may be used, for instance 1200 mm 40W Philips actinic tubes. Typically 3 to 4 of these lamps may be used, each at a distance of 40 to 110 mm, especially about 70 mm from the reactor. Measurement of UV intensity is determined by a SolaScope 1. The polymerization zone within the reaction may be varied according to the requirements of the polymerization. Typically polymerization zone may be between 200 and 2000 mm, preferably 600 to 1000 mm, especially about 800 mm. Desirably the residence time for polymerisation may be from 5 minutes to 60 minutes, typically 10 to 30 minutes, especially about 20 minutes.

In some cases it may be desirable to employ a post treatment process, for example to reduce the level of free monomer and in this case an intensity of at least 20 mW/cm$^2$, preferably around 40 mW/cm$^2$ may be used. The wavelengths used may desirably be 340 to 420 nm, especially 366 to 408 nm. Typically 400W Philips HPA lamps may be used for this purpose. The lamps may be arranged for instance in such a way that two 2 of the lamps are placed around a bank of 6 standard C1/12 Liebig condensers linked together in series, each lamp at a distance of approximately 100 mm from the condensers. Desirably the residence time for post treatment may be from 5 minutes to 60 minutes, typically 10 to 30 minutes, especially about 20 minutes. Preferably the post treatment is conducted in an apparatus according to the second aspect of the present invention and which is more preferably substantially the same apparatus used for the polymerisation process. A multiplicity of lamps would be desirably arranged around the post treatment reactor such that the liquid containing polymer material is exposed to a comparatively high intensity ultraviolet light. When the post treatment is for the purpose of reducing free monomer, ultra violet light having an intensity of at least 20 mW/cm$^2$, preferably around 40 mW/cm$^2$ may be used. The wavelengths used may desirably be 340 to 420 nm, especially 366 to 408 nm. Typically 400W Philips HPA lamps may be used for this purpose.

Alternatively the process may involve irradiating the liquid monomeric material with other forms of radiation, for instance infra red light, microwave radiation, X-rays and other forms of electromagnetic radiation.

It may be desirable to expose the reaction medium to other physical effects, such as heating or cooling. In this form the heating or cooling may be provided by a heating or cooling jacket surrounding the reactor. Such a jacket may completely or partially surround the reactor. Alternatively a heating or cooling device can be built into the wall of the reactor.

Suitably the reaction medium may be exposed to a magnetic field, for instance as described in U.S. Pat. No. 4,448,657.

It may also be desirable to inject other materials, such as liquids or gasses into the reactor. Suitably an inert gas can be injected into the reactor and a positive pressure of inert gas maintained. This may be necessary to remove oxygen from the reaction medium. Typically nitrogen may be used for this purpose, although other inert gasses, such as argon may also be used.

In another form of the invention the process concerns the treatment of liquid compositions that comprise polymer. When the liquid precursor material comprises a polymeric material it is necessary that the composition that results is also a liquid. Thus both the starting and finishing compositions must be sufficiently fluid such that they can enter and exit the reactor easily. Typically in this form of the invention the reaction conditions are selected from the group consisting of hydrolysis, Mannich reaction, curing, post polymerisation and residual monomer reduction. Thus in this form of the invention the treatment of the liquid polymer composition includes introducing co-reactants into the composition in the reactor. Alternatively the post treatment may be subjecting the composition to heat treatment or UV irradiation.

In a further form of the invention we provide a process in which a liquid polymerisable material is subjected to polymerisation conditions in a first reactor to form a first liquid polymer composition. This composition can then be transferred to a second reactor wherein the composition may be subjected to reaction conditions, for instance reactions conditions as given before. Thus a liquid polymerisable material may be polymerised to form a liquid polymer composition in a first reactor. This polymeric liquid can then be transferred to a second reactor where it may be subjected to a further treatment, for instance ultraviolet radiation, in order to remove or reduce the residual monomer content.

Generally polymerisation processes are conducted in accordance with the present invention, by employing said coaxial tubular (preferably cylindrical) inner and outer surfaces, in which only the inner surface rotates about the common axis.

We have found that a more consistent product is obtained by conducting the process in the absence of a Taylor vortex. In particular we have been able to produce reverse phase emulsion polymers of consistently high quality in terms of molecular weight, low residual monomer concentration and maintain equivalent or improved stability using these relatively quiescent process conditions.

The Taylor number, $T_a$, is defined by the equation:

$$T_a = \left(\frac{\omega b R_i}{v}\right)\left(\frac{b}{R_i}\right)^{1/2}$$

where $R_i$=inner cylinder radius (m)
b=radial clearance between concentric cylinders (m)
v=kinematic viscosity ($m^2 s^{-1}$)
$\omega_i$=angular velocity of inner cylinder ($s^{-1}$)

It is known that Taylor vortex formation commences at a point when the Taylor number $T_a$ is about 46. Thus it is preferred that the process is carried out under conditions where the Taylor number $T_a$ is significantly below 46. In accordance with the present invention a Taylor vortex may suitably be avoided by rotating the inner cylinder at an insufficient speed to generate a Taylor vortex. Generally the exact threshold for generating a Taylor vortex will depend upon the exact dimensions of the inner and outer surfaces. This can be determined using the above formula.

The liquid precursor material enters the reactor through an inlet port. The inlet is preferably positioned such that the liquid enters towards one end of the reactor and leaves by an outlet positioned at the other end. The inlet port may be positioned at or near the top of the reactor. Preferably though the inlet port is positioned in the lower third of the outer interior surface and the outer port is positioned in the upper third of the outer interior surface.

The liquid precursor material should enter the reactor in such a way that it becomes distributed throughout the space between the inner and outer surfaces. This can easily be achieved by mounting the inlet port tangentially, such that the liquid precursor material enters the reactor tangentially. The distribution of the liquid material is further facilitated by the inner surface rotating in the same direction of the liquid entering the reactor.

The inner surface may move faster than the flow rate of liquid entering the reactor. Typically the inner surface will rotate at least 10 rpm. Generally the rate of rotation will be less than 1,000 rpm and will usually be within 50 and 500 rpm, for instance 100 or 200 rpm.

Generally the liquid precursor material is subjected to heat or radiation treatment within the reactor. Typically the liquid is subjected to ultra violet radiation. Desirably at least a portion of the outer interior surface is a wall that consists of a material that allows the transmission of ultra violet light and at least one ultra violet light source is positioned on the exterior of the wall and the liquid precursor material is irradiated as it flows through the space between the interior surfaces. Preferably the whole outer interior surface is a transparent which transmits ultra violet light. Generally a multiplicity of light sources may be conveniently arranged around the transparent wall. For instance four ultra violet lamps may be arranged around the transparent reactor wall arranged at 90° to each other.

Desirably there is constant distance between the inner and outer surface. Preferably the distance between the inner interior surface and the outer interior surface is up to 5 mm, preferably 3 to 4 mm. Distances of this order appear to be particularly suited to UV initiated polymerisation processes.

We have found the present invention to be particularly suitable for radiation polymerisation, in particular by ultra violet radiation. The relatively short distance between the inner and outer surfaces means that the ultraviolet radiation can penetrate substantially throughout the polymerisation medium. The process allows a relatively large area of irradiation per volume of reaction medium and this facilitates the preparation of polymers having consistently higher quality in terms of molecular weight and also reduction of unreacted monomer.

The liquid precursor according to one form of the invention is a liquid polymerisable material. Generally the liquid comprises a monomer, which is preferably a monomer or monomer blend comprising one or more ethylenically unsaturated monomers. Preferably the liquid monomer composition is selected from the group consisting of i) an aqueous emulsion or suspension comprising hydrophobic monomer or monomer blend, ii) a reverse phase emulsion or suspension comprising a hydrophilic aqueous monomer or monomer blend and a continuous water immiscible phase, iii) an aqueous composition comprising hydrophilic monomer or monomer blend in an aqueous continuous phase, capable of forming a pourable composition comprising a hydrophilic polymer dispersed in an aqueous medium and, iv) an aqueous monomer solution capable of forming pourable liquid aqueous polymer solution.

Thus in one form of the invention the liquid monomer composition is an aqueous emulsion of hydrophobic monomer. Such a composition may be formed by emulsifying a water insoluble monomer into an aqueous continuous phase. The aqueous phase may comprise emulsifiers or stabilisers. Generally the aqueous phase will comprise emulsifiers exhibiting a high hydrophilic lipophilic balance (HLB) i.e. associates more with the aqueous continuous phase. The monomer or monomer blend comprises water insoluble monomers. By water insoluble we mean monomer which have a solubility in water less than 5% by weight at 25° C. The monomer or monomer blend preferably comprises one or more hydrophobic ethylenically unsaturated monomer blend one or more hydrophobic ethylenically unsaturated monomers selected from the group consisting of acrylonitrile, $C_{1-30}$ alkyl (meth) acrylates, $C_{1-30}$ alkyl (meth) acrylamides, vinyl acetate and styrene. In another form the invention the liquid monomer composition is a reverse phase emulsion of hydrophilic monomer. This composition may be formed by emulsifying an aqueous solution of hydrophilic monomer into a water immiscible liquid continuous phase. The continuous phase may comprise emulsifiers exhibiting a low hydrophilic lipophilic balance (HLB) i.e. associates more with the water immiscible continuous phase. The monomer or monomer blend preferably comprises one or more hydrophilic ethylenically unsaturated monomers which is water soluble. By water soluble we mean that the monomer has a solubility of at least 5% by weight at 25° C. Thus the monomer is selected from the group consisting of acrylamide, (meth)acrylic acid (or salts), maleic acid (or salts), maleic anhydride, dialkylaminoalkyl (meth)acrylate (or acid addition salts or quaternary ammonium salts), dialkylaminoalkyl (meth)acrylamide (or acid addition salts or quaternary ammonium salts), hydroxyalkyl (meth)acrylates and 2-acrylamido-2-methylpropane sulphonic acid (or salts). A typical reverse phase process is described in EP-A-150933, EP-A-102760 or EP-A-126528.

A further aspect of the invention relates to a process for making an aqueous dispersion of a hydrophilic polymer comprising reacting an aqueous composition comprising hydrophilic monomer or monomer blend in an aqueous continuous phase, capable of forming a pourable composition comprising a hydrophilic polymer dispersed in an aqueous medium. Typically such polymers are described in WO-A-9831749 and WO-A-9831748.

In a still further version of the process an aqueous solution of monomer which is capable of forming a low viscosity aqueous solution of polymer. One example of low viscosity aqueous polymer solution includes the preparation of an aqueous solution of dilute low molecular weight poly diallyl dimethyl ammonium chloride (DADMAC). Another example includes reacting secondary amines with epoxy compounds, including epichlorhydrin to form low molecular weight polyamines.

For some large scale production processes it may be desirable to use several processes in parallel. In such a production plant it may be required to operate at least 5 reactors in parallel. For very large scale production processes it may be necessary to employ up to 500 individual reactors. Generally the numbers of reactors working in parallel would be greater than 20 and less then 400 reactors, for instance 50 to 200 especially 200 to 250 reactors.

The second aspect of the invention is directed to a novel apparatus for conducting chemical reactions. Thus this aspect of the invention is directed to an apparatus comprising a space between interior surfaces comprising an inner interior surface and an outer interior surface, a tangentially mounted inlet port in the outer interior surface, a tangentially mounted outlet port in the outer interior surface, characterised in that the distance of the inner internal surface and the outer interior surface is less than 20 mm and the ratio of the cross-sectional diameter (D') of the inner interior surface to the cross-sectional diameter (D") of the outer interior surface is at least 0.8:1.

Preferably the surface area of the inner interior surface is at least 80% of the surface area outer interior surface.

The apparatus preferably comprises any of the preferred features discussed above.

The following description of a reverse phase polymerisation process illustrates the invention by reference to FIG. 1.

An aqueous monomer composition comprising an ultraviolet initiator is emulsified into a water immiscible liquid, containing a water in oil emulsifier, to form an emulsion. The reverse phase emulsion of aqueous monomer in oil solution is fed into the reactor through tangential inlet port [1]. The liquid monomer composition is distributed between the space between the outer internal surface [2] and inner internal surface [3]. The inner internal surface is the outer surface of rotating element [4]. The rotating element can be driven by motor [12] in direction [13], wherein the element is held at the other end by a suitable bearing [14]. The bearing may be constructed of a suitable material, for instance PTFE. Outer internal surface is the inner surface of the exterior wall of the reactor, which is transparent. An ultraviolet light source can be placed parallel to the reactor against the transparent wall such that the liquid monomer composition containing ultra violet initiators is subjected to ultraviolet radiation in order to polymerise the dispersed phase monomer. The formed liquid polymer composition exits through a tangentially mounted exit port [6] in the reactor wall. A positive nitrogen pressure is maintained in the device. Nitrogen is injected through injection point [7] and is removed through gas outlet [8]. A jacket [9] is provided for heating or cooling as desired; the diagram shows a jacket inlet [10] and a jacket outlet [11]. A transparent section [5] in the wall of the reactor may be provided in order to allow irradiation by for instance ultra violet light. Alternatively the whole exterior wall may be constructed of a material transparent to ultra violet light.

Figure 2:
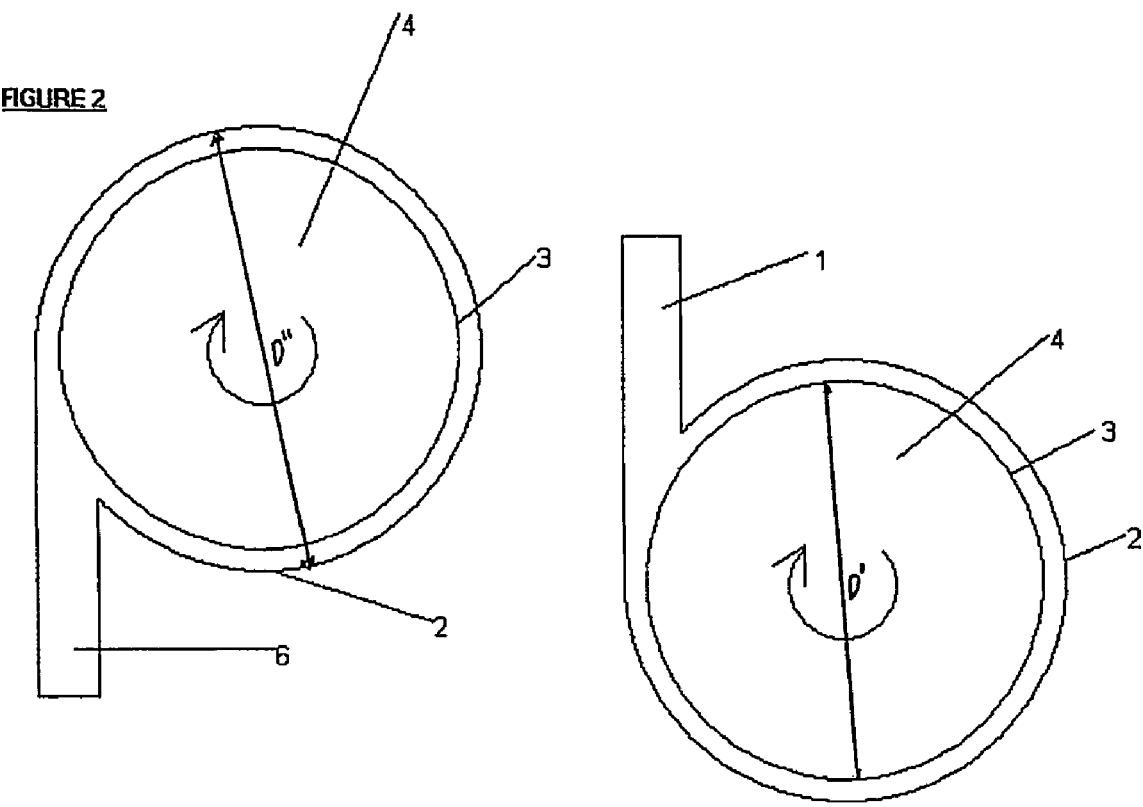

FIG. 2 shows a cross-section of the reactor A-A, illustrating the tangential inlet port a cross-section of the reactor B-B, illustrating the tangential outlet port.

Figure 3:
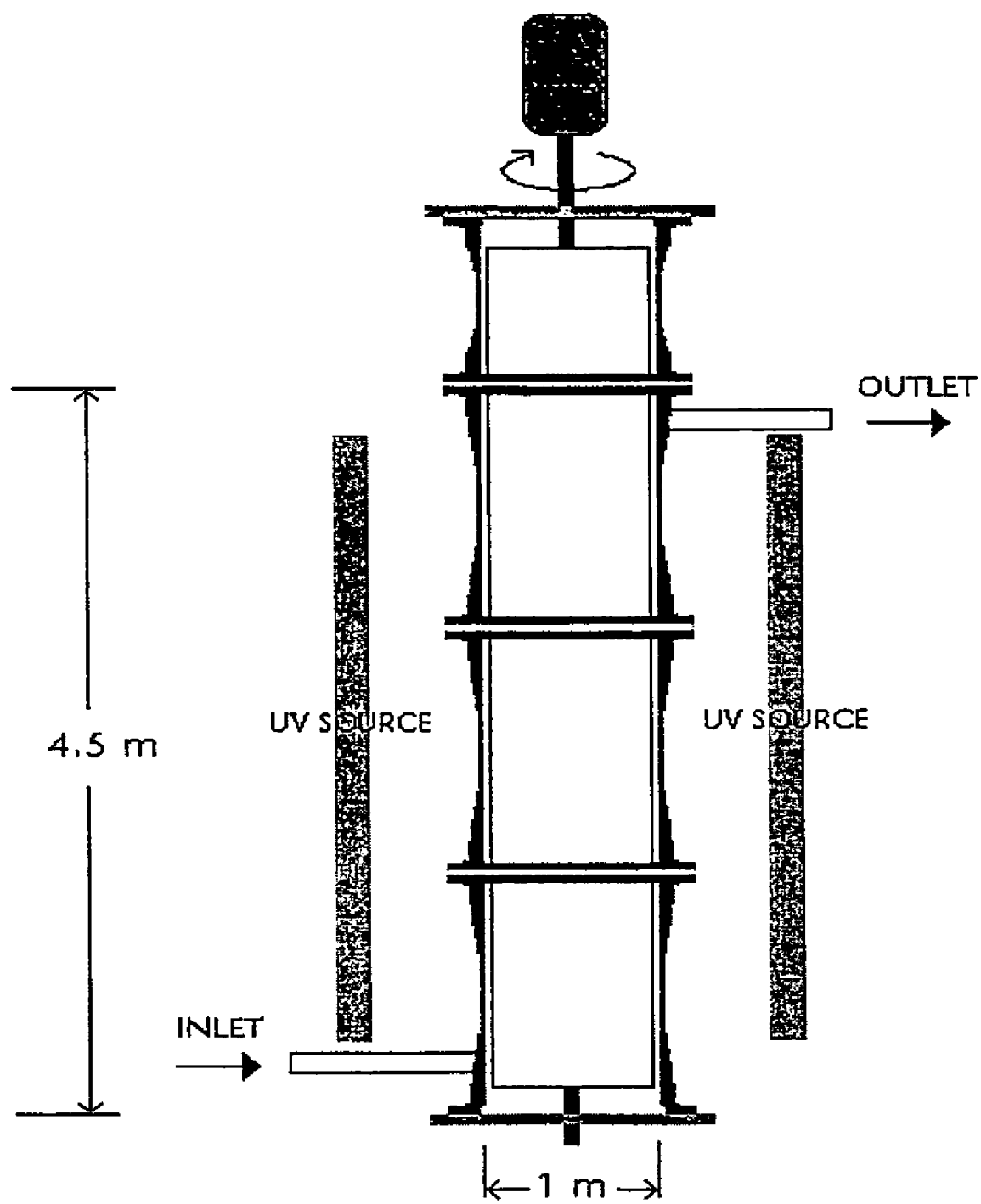

FIG. 3 shows a scale apparatus in accordance with the present invention and suitable for a full scale production plant. The apparatus may be constructed from standard commercially available components. These may be made from any suitable materials, but desirably are made from borosilicate glass which is transparent to ultra violet UV-A wavelengths. Alternatively the apparatus may comprise materials that allow the transmission of other UV wavelengths. A suitable material includes quartz. The body of the reactor comprises three lengths of pipe section each having overall length 1.5 m and internal diameter 1.0 m. The reactor head consists of a pipe section of overall length 1.0 m and internal diameter 1.0 m. The internal cylinder may be constructed of any suitable material. Typically the inner cylinder could be constructed from stainless steel. This may desirably have a gauge of 3 mm and have a density of 8.0 g/cm$^3$. The clearance between the internal cylinder and the inner face of the vessel wall should be less than 20 mm, preferably it is 4 mm.

Figure 4:
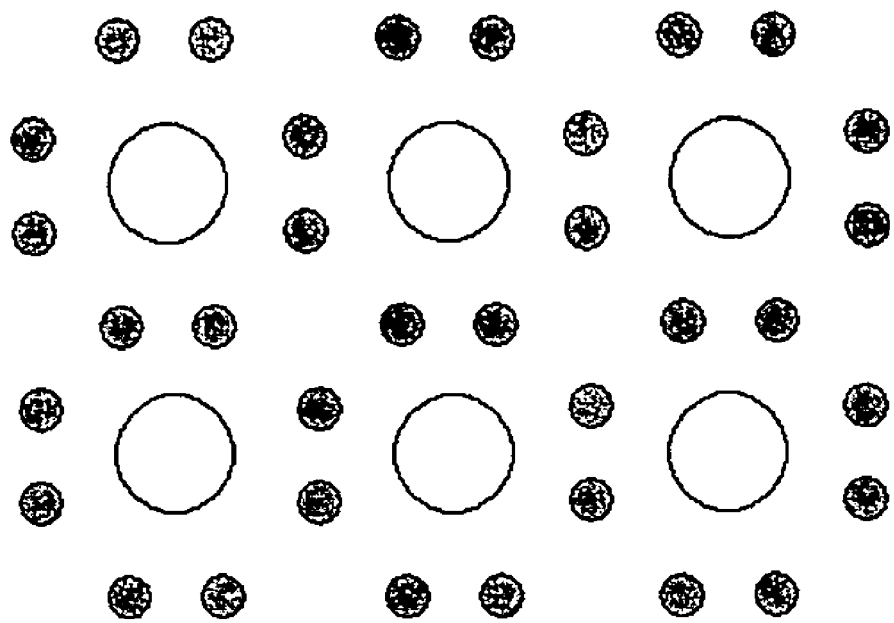
Figure 5:
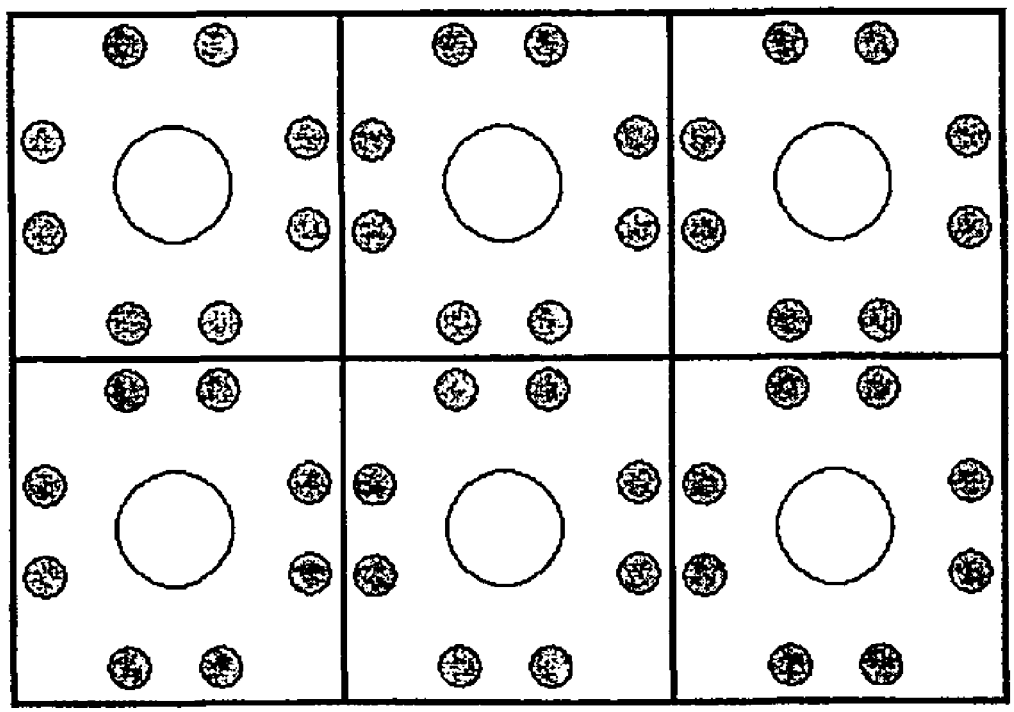

In a preferred embodiment of the invention, several ultraviolet light sources can be arranged around the one or more reactors for example as shown in FIGS. 4 and 5. FIG. 4 shows a plan view of six reactors according to the invention each surrounded by ultra violet light sources shown as shaded circles. The whole array may be enclosed in a light-proof encasement constructed to facilitate exchange of spent tubes. In this manner the irradiation of an array of these reactors can be achieved by means of a matrix of UV tubes, many of which will be illuminating more than one reactor.

FIG. 5 shows a plan view of six reactors each in a separate encasement and each surrounded by eight UV tubes. In this case more lights are needed than in FIG. 4, but each unit can be housed in separate compartments and this may facilitate maintenance and repair.

The invention claimed is:

1. A process of preparing a liquid reaction product in a column reactor, which reactor comprises a space between coaxial tubular interior surfaces comprising an inner interior surface and an outer interior surface, comprising the steps,
   a) feeding a liquid reaction precursor material through an inlet port in the outer interior surface,
   b) flowing the liquid precursor material through the space between the outer interior surface and the inner interior surface, wherein the outer interior surface is transparent which outer interior surface transmits ultra violet light,
   c) subjecting the liquid precursor material in step (b) to reaction conditions to form the liquid reaction product, comprising subjecting the liquid precursor material to ultra violet radiation,
   d) passing the liquid reaction product through an outlet port in the outer interior surface,
   wherein the distance between the inner internal surface and the outer interior surface is less than 20 mm and the ratio of the cross-sectional diameter (D') of the inner interior surface to the cross-sectional diameter (D") of the outer interior surface is at least 0.8:in which the liquid precursor material is a liquid polymerisable material in which the liquid precursor material is a liquid monomeric composition selected from a group consisting of,
   i.) an aqueous emulsion or suspension comprising a hydrophobic monomer or monomer blend,
   ii.) a reverse-phase emulsion or suspension comprising a hydrophilic aqueous monomer or monomer blend and a continuous water immiscible phase,
   the reaction conditions are polymerisation conditions, the liquid polymer composition has a viscosity of below 5,000 mPa·s measured using a Brookfield RVT, spindle 4, at 50 rpm and 25° C. and the liquid reaction product is a liquid polymer composition.

2. A process according to claim 1 in which the surface area of the inner interior surface is at least 80% of the surface area of the outer interior surface.

3. A process according to claim 2 in which the liquid precursor material comprises a polymeric material and the reaction conditions are selected from the group consisting of hydrolysis, Mannich reaction, curing, post polymerisation and residual monomer reduction.

4. A process according claim 1 in which the liquid polymerisable material is subjected to polymerisation conditions in a first reactor to form a first liquid polymer composition, which composition is transferred to a second reactor and subjected to reaction conditions selected from the group consisting of hydrolysis, Mannich reaction, curing, post polymerisation and residual monomer reduction.

5. A process according to claim 1 in which the inner interior surface rotates about a central axis.

6. A process according to claim 1 in which the process is conducted in the absence of a Taylor vortex.

7. A process according to claim 1 in which the inlet port is positioned in the lower third of the outer interior surface and the outer port is positioned in the upper third or the outer interior surface.

8. A process according to claim 1 in which the inlet port is positioned such that the liquid precursor material enters the reactor tangentially and in which the outlet port is positioned such that the liquid reaction product composition exits the reactor tangentially.

9. A process according to claim 1 in which at least a portion of the outer interior surface is a wall that consists of a material that allows the transmission of ultra violet light and at least one ultra violet light source is positioned on the exterior of the wall and the liquid precursor material is irradiated as it flows through the space between the interior surfaces.

10. A process according to claim 1 in which the distance between the inner interior surface and the outer interior surface is up to 5 mm.

11. A process according to claim 10 in which the monomer or monomer blend comprising one or more hydrophilic or potentially hydrophilic ethylenically unsaturated monomers is selected from the group consisting of acrylamide, (meth) acrylic acid and salts thereof, maleic acid and salts thereof, maleic anhydride, dialkylaminoalkyl (meth)acrylate and acid addition salts or quaternary ammonium salts thereof, dialkylaminoalkyl (meth)acrylamide and acid addition salts or quaternary ammonium salts thereof, hydroxyalkyl (meth)acrylates and 2-acrylamido-2-methylpropane sulphonic acid and salts thereof.

12. A process according to claim 11 in which the monomer or monomer blend comprises one or more hydrophilic ethylenically unsaturated monomers and one or more hydrophobic ethylenically unsaturated monomers selected from the group consisting of acrylonitrile, $C_{1-30}$ alkyl (meth) acrylates, $C_{1-30}$ alkyl (meth) acrylamides, vinyl acetate and styrene.

13. A process according to claim 1 in which the liquid precursor material comprises ultraviolet initiators.

14. A method of preparing a liquid polymeric composition, by operating in parallel, a multiplicity of processes according to claim 1.

* * * * *

UNITED STATES PATENT AND TRADEMARK OFFICE
CERTIFICATE OF CORRECTION

PATENT NO. : 7,601,786 B2 Page 1 of 1
APPLICATION NO. : 10/450622
DATED : October 13, 2009
INVENTOR(S) : Gillett et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1132 days.

Signed and Sealed this

Fifth Day of October, 2010

David J. Kappos
*Director of the United States Patent and Trademark Office*